(12) United States Patent  (10) Patent No.: US 8,683,799 B2
Azuma  (45) Date of Patent: Apr. 1, 2014

(54) CONTROL DEVICE OF TURBOCHARGER

(75) Inventor: Yasuhiro Azuma, Obu (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 337 days.

(21) Appl. No.: 13/141,587

(22) PCT Filed: Nov. 12, 2010

(86) PCT No.: PCT/JP2010/070200

§ 371 (c)(1),
(2), (4) Date: Jun. 22, 2011

(87) PCT Pub. No.: WO2012/063359

PCT Pub. Date: May 18, 2012

(65) Prior Publication Data

US 2012/0121392 A1 May 17, 2012

(51) Int. Cl.
*F02D 23/00* (2006.01)
*F02B 37/24* (2006.01)

(52) U.S. Cl.
USPC .......................................................... 60/602

(58) Field of Classification Search
CPC ........ F02B 37/24; F02B 37/00; F02B 37/001; F02B 37/007; F02D 41/042; F02D 41/0007; B60K 6/445; B60W 20/00; Y02T 10/144; Y02T 10/146
USPC .................................... 60/602; 701/114–115

IPC ........................................................... F02B 37/24
See application file for complete search history.

(56) References Cited

U.S. PATENT DOCUMENTS

| 7,463,969 | B2 * | 12/2008 | Yamaguchi et al. | 60/602 |
| 7,805,938 | B2 * | 10/2010 | Roh | 60/602 |
| 2008/0035112 | A1 * | 2/2008 | Yamaguchi et al. | 123/559.1 |
| 2013/0288854 | A1 * | 10/2013 | Kobayashi | 477/5 |

FOREIGN PATENT DOCUMENTS

| EP | 1 458 963 B1 | 6/2005 |
| EP | 1 304 462 B1 | 12/2006 |
| JP | 10-037754 A | 2/1998 |
| JP | 2000-282926 A | 10/2000 |
| JP | 2003-129853 A | 5/2003 |
| JP | 2003-129854 A | 5/2003 |
| JP | 2006070781 A * | 3/2006 | F02B 37/24 |
| JP | 2008-075635 A | 4/2008 |
| JP | 2010-025054 A | 2/2010 |
| WO | 03/036062 A1 | 5/2003 |

\* cited by examiner

*Primary Examiner* — Thai Ba Trieu
(74) *Attorney, Agent, or Firm* — Sughrue Mion, PLLC

(57) ABSTRACT

A turbocharger includes a plurality of nozzle vanes provided on an outer circumferential side of a turbine wheel, a variable nozzle vane mechanism adjusting a flow of an exhaust gas with the nozzle vanes, and an actuator driving the nozzle vane mechanism. A control device for the turbocharger continues an abutting control that causes a movable member of the variable nozzle vane mechanism to abut against a stopper that regulates the movable range of the nozzle vanes as long as the engine is stopped while the vehicle is running.

12 Claims, 9 Drawing Sheets

CONTROL DEVICE OF TURBOCHARGER

CROSS REFERENCE TO RELATED APPLICATION

This application is a National Stage of International Application No. PCT/JP2010/07022 filed Nov. 12, 2010, the contents of all of which are incorporated herein by reference in their entirety.

TECHNICAL FIELD

The present invention relates to a control device of a turbocharger mounted to a hybrid vehicle or the like, and more specifically to a control device of a variable nozzle vane turbocharger.

BACKGROUND ART

Engines (internal combustion engines) in vehicles are often equipped with turbochargers (superchargers) that utilize the exhaust energy. Ordinarily, turbochargers include a turbine wheel that is rotated by the exhaust gas flowing through an exhaust path of the engine, a compressor impeller that forces the air in the intake path into combustion chambers of the engine, and a coupling shaft that couples the turbine wheel and the compressor impeller. In a turbocharger having such a structure, when the exhaust gas blows against the turbine wheel and rotates the turbine wheel, then this rotation is transmitted via the coupling shaft to the compressor impeller. Thus, the air in the intake path is forced into the combustion chambers by the rotation of the compressor impeller.

As one kind of turbochargers, variable nozzle vane turbochargers are known, in which the turbine wheel side is provided with a variable capacity. The variable nozzle vane turbochargers include a variable nozzle vane mechanism (VN mechanism) and an actuator (motor-type actuator). The variable nozzle vane mechanism includes a plurality of nozzle vanes (also referred to as "movable vanes") that are arranged in the exhaust gas flow path in a turbine housing, for example, and vary the flow path area of the exhaust gas flow path. The actuator displaces (rotates) the nozzle vanes. By changing the opening degree of the nozzle vanes, the flow path area (throat area) between neighboring nozzle vanes is changed, and thus the flow speed of the exhaust gas that is introduced towards the turbine wheel is adjusted. Thus, by adjusting the flow speed of the exhaust gas, the rotation speed of the turbine wheel and the compresser impeller is adjusted, so that the pressure of the air that is introduced into the combustion chambers of the engine can be adjusted. Moreover, by adjusting the amount of air taken into the combustion chambers in this manner, it becomes possible to both increase the engine output as well as prevent abnormal combustion inside the combustion chambers. Furthermore, this kind of variable nozzle vane turbocharger may be provided with a stopper that limits the range of the movement of the nozzle vanes, that is, their position in the closed state and their position in the open state (see PTLs 1 and 2, for example).

CITATION LIST

Patent Literature

[PTL 1] JP 2003-129853A
[PTL 2] JP 2003-129854A
[PTL 3] JP 2010-025054A

SUMMARY OF INVENTION

Technical Problem

Now, in hybrid vehicles having an engine as well as an electric motor as a running power source, if a predetermined engine stop condition is met during the engine running, then the engine is stopped and the drive wheels are driven only by the power of the electric motor. When the vehicle is running in this engine stop state, it may occur that a link or rod or the like that are structural members of the variable nozzle vane mechanism suffer wear due to vibrations when the vehicle is running. That is to say, in the control of the variable nozzle vane turbocharger of the motor-driven type, after the engine is stopped, the electric motor is normally in a state in which no current passes through the electric motor, and no load acts on the link, rod or the like (unconstrained state). Therefore, when vibrations (such as running vibrations) act on the variable nozzle vane mechanism from outside, the link, rod or the like slide easily (i.e. their backlash portions slide) on components fitted to them, so that wear may occur. When this wear advances, there is the risk that a malfunction occurs in the supercharging pressure control.

In view of these circumstances, it is an object of the present invention to realize control for a variable nozzle vane turbocharger mounted to a vehicle, that prevents wear on structural members of the variable nozzle vane mechanism, such as a link or a rod, during an engine stop while the vehicle is running.

Solution to Problem

In accordance with the present invention, a control device of a turbocharger is provided that includes a turbine wheel provided in an exhaust path of an engine mounted to a vehicle; a compressor impeller provided in an intake path of the engine; a variable nozzle vane mechanism including a plurality of nozzle vanes provided on an outer circumferential side of the turbine wheel, the variable nozzle vane mechanism adjusting a flow of an exhaust gas with the plurality of nozzle vanes; and an actuator driving the nozzle vane mechanism. The control device of the turbocharger has the technical feature that it continues an abutting control that causes a movable member (for example a driving link) of the variable nozzle vane mechanism to abut against a mechanical stopper as long as the engine is stopped while the vehicle is running.

In the present invention, that "the engine is stopped" while the vehicle is running includes not only the case that the engine speed is "0" (the pistons are stopped), but also the case that no gas flows from the combustion chambers of the engine to the exhaust system (the nozzle vanes), for example because the intake valve and the exhaust valve are both "closed", even though the pistons move in a state in which driving of the engine is stopped (state in which the fuel is cut).

A more specific example of the above-mentioned mechanical stopper is a stopper that limits the range of the movement of the nozzle vanes. In this case, as long as the engine is stopped while the vehicle is running, the movable member (for example a driving link) of the variable nozzle vane mechanism may abut against a fully-closed stopper that limits the position on the closed side of the nozzle vanes, or the movable member (for example the open/close arms) of the variable nozzle vane mechanism may abut against a fully-open stopper that limits the position on the open side of the nozzle vanes.

Moreover, an example of a specific configuration of the present invention is one in which an actuator that drives the variable nozzle vane mechanism is a motor-type actuator including an electric motor, which continuously performs said abutting control by continuously causing a current to flow through the electric motor as long as the engine is stopped while the vehicle is running.

The following is an explanation of the operation of the present invention. First, when the movable member (for example, the driving link or the like) of the variable nozzle vane mechanism abuts with a predetermined load against the mechanical stopper (for example, a stopper limiting the range of the movement of the nozzle vanes), the backlash (gap) of the sliding portions of the variable nozzle vane mechanism, such as the driving link and the rod, is eliminated, and the link and the rod are constrained by the load (more specifically, by the driving force of the electric motor). That is to say, by performing the abutting control of abutting against the stopper, it is possible to prevent the link, the rod from sliding on components fitted to them, even when vibrations during the running of the vehicle act on the variable nozzle vane mechanism. And by continuing this abutting control of abutting against the stopper (referred to as VN abutting control below) as long as the engine is stopped while the vehicle is running, it is possible to prevent for example the link and the rod of the variable nozzle vane mechanism from suffering wear during an engine stop while the vehicle is running.

In the present invention, an example of the period during which the abutting control of abutting against the stopper is continued while the vehicle is running is the period from the stopping of the engine in accordance with an engine stop request (for example, engine stop flag: ON) until there is an engine start request (for example, engine start flag: ON).

Here, if a motor-type actuator is used, then it is not necessary to drive the electric motor at full power during the above-described VN abutting control. That is to say, a motor power is sufficient, with which a load can be ensured at which the structural members of the variable nozzle vane mechanism, such as the link and the rod, can be sufficiently constrained. The motor power during this VN abutting control is explained in the following.

Firstly, a lower limit of the motor load at which for example the link and the rod are constrained without sliding (sliding of the backlash portions), even when vibrations during the running of the vehicle act on the variable nozzle vane mechanism, may be measured in advance by an experiment or a simulation or the like. Then, the value obtained by adding a predetermined margin to the measured lower limit of the motor load may be set as the motor target power (motor target power=lower limit of motor load+margin), and the current control of the electric motor may be performed such that this motor target power is attained. An example of the current control of the electric motor may be a method in which the current flowing through the electric motor is limited such that a motor target power is attained that is smaller (for example about 50% of the full power) than the full power (the voltage of the power supplied from the car battery to the electric motor is substantially constant).

Then, by controlling the motor power in this way, the power that is consumed while the VN abutting control continues can be reduced. Moreover, it can be avoided that the motor load becomes excessive, and also a reduction of the lifetime of the electric motor can be suppressed.

Advantageous Effects of Invention

In accordance with the present invention, the abutting control of the variable nozzle vane mechanism is continued as long as the engine is stopped while the vehicle is running, so that it can be prevented that structural members of the variable nozzle vane mechanism, such as a link and a rod, suffer wear during an engine stop while the vehicle is running.

DESCRIPTION OF EMBODIMENTS

The following is an explanation of embodiments of the invention with reference to the accompanying drawings.

Figure 1:
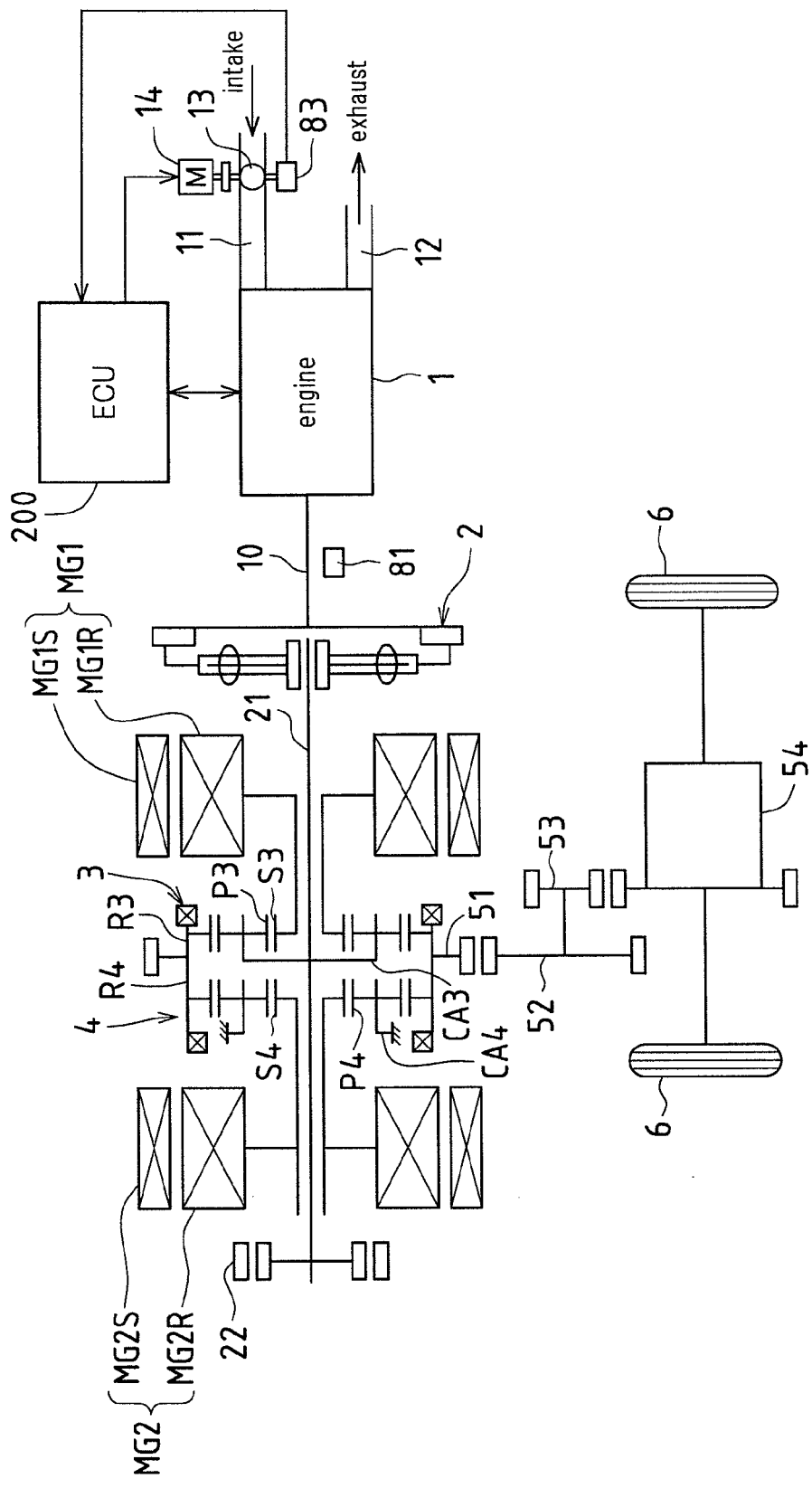
FIG. 1 is a schematic diagram illustrating an example of a vehicle equipped with a turbocharger to which the present invention is applied.

FIG. 1 is a schematic diagram illustrating an example of a hybrid vehicle to which the present invention is applied.

The hybrid vehicle HV of this example is of the FF (front engine, front-wheel drive) type, and includes an engine 1, a first motor generator MG1 functioning mainly as an electric generator, a second motor generator MG2 functioning mainly as an electric motor (motor), a power splitting mechanism 3, a reduction mechanism 4, a counter-drive gear 51, a counter-driven gear 52, a final ring gear 53, a differential device 54, drive wheels 6, and an ECU (Electronic Control Unit) 200.

The ECU 200 is constituted for example by a hybrid ECU, an engine ECU, a battery ECU and the like, and these ECUs are connected such that they can communicate with each other.

The following is an explanation of the various parts of the engine 1, the motor generators MG1 and MG2, the power splitting mechanism 3, the reduction mechanism 4, and the ECU 200.

Engine

The engine 1 is a publicly known motor device that outputs a motive power by combusting fuel, such as a gasoline engine or a diesel engine, and is configured such that its operating state, for example the fuel injection amount and the throttle opening degree of a throttle valve 13 provided in an intake path 11 (intake air amount) can be controlled. The rotation speed (engine speed) of a crankshaft 10 serving as the output shaft of the engine 1 is detected by an engine speed sensor 81. Moreover, the engine 1 of this example is equipped with a turbocharger 100 (see FIG. 2). The configuration of the turbocharger 100 is explained further below. It should be noted that the throttle valve 13 is opened and closed by a throttle motor 14. Moreover, the opening degree of the throttle valve 13 is detected by a throttle opening degree sensor 83.

The output of the engine 1 is transmitted via the crankshaft 10 and a damper 2 to an input shaft 21. The damper 2 is a coil spring-type transaxle damper, for example, and absorbs torque fluctuations of the engine 1. It should be noted that the other end of the input shaft 21 is coupled to an oil pump 22, which receives a rotation torque of the input shaft 21 to operate the oil pump 22.

Motor Generators

The first motor generator MG1 is an AC synchronous electric generator including a rotor MG1R made of a permanent magnet supported rotatably with respect to the input shaft 21, and a stator MG1S with three-phase windings, and functions as an electric generator as well as an electric motor (motor). Also the second motor generator MG2 is an AC synchronous electric generator including a rotor MG2R made of a permanent magnet supported rotatably with respect to the input shaft 21, and a stator MG2S with three-phase windings, and functions as an electric motor (motor) as well as an electric generator.

Figure 8:
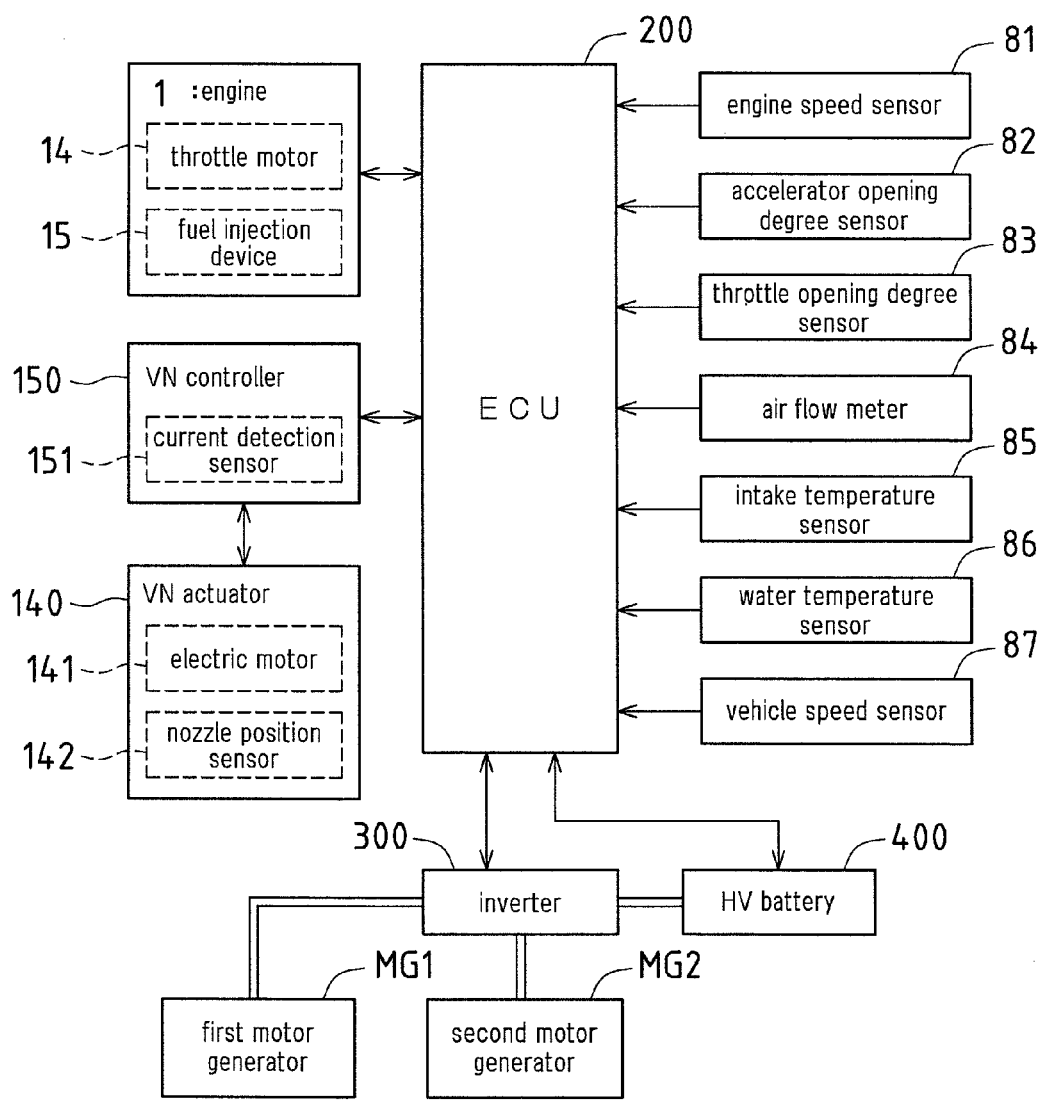
FIG. 8 is a block diagram showing the configuration of a control system, such as an ECU.

As shown in FIG. 8, the first motor generator MG1 and the second motor generator MG2 are both connected via an inverter 300 to an HV battery (electric accumulator) 400. The inverter 300 is controlled by an ECU 200, and the motor generators MG1 and MG2 are set to regeneration or drive (assist) by controlling this inverter 300. The regeneration power is charged via the inverter 300 to the HV battery 400. The driving power for the motor generators MG1 and MG2 is supplied from the HV battery 400 via the inverter 300.

Power Splitting Mechanism

As shown in FIG. 1, the power splitting mechanism 3 is configured by a planetary gear train including a sun gear S3, pinion gears P3, a ring gear R3 and a planetary carrier CA3. The sun gear S3 is an external gear that revolves around itself at the center of the plurality of gear elements. The pinion gears P3 are external gears that revolve around themselves while orbiting around the sun gear S3 in contact with the same. The ring gear R3 is an internal gear that has a hollow ring shape and meshes with the pinion gears P3. The planetary carrier CA3 supports the pinion gears P3 and revolves around itself through the orbiting of the pinion gears P3. The planetary carrier CA3 is coupled in a rotatably fixed manner to the input shaft 21 on the side of the engine 1. The sun gear S3 is coupled to the rotor MG1R of the first motor generator MG1 so as to rotate integrally with the rotor MG1R.

This power splitting mechanism 3 transmits the driving power of at least one of the engine 1 and the second motor generator MG2 via the counter-drive gear 51, the counter-driven gear 52, the final ring gear 53, and the differential device 54 to the left and right drive wheels 6.

Reduction Mechanism

As shown in FIG. 1, the reduction mechanism 4 is configured by a planetary gear train including a sun gear S4, pinion gears P4, and a ring gear R4. The sun gear S4 is an external gear that revolves around itself at the center of a plurality of gear elements. The pinion gears P4 are external gears that are rotatably supported by a carrier (transaxle case) CA4 and revolve around themselves while orbiting around the sun gear S4 in contact with the same. The ring gear R4 is an internal gear that has a hollow ring shape and meshes with the pinion gears P4. The ring gear R4 of the reduction mechanism 4, the ring gear R3 of the power splitting mechanism 3 and the counter-drive gear 51 are integrated with each other. The sun gear S4 is coupled to the rotor MG2R of the second motor generator MG2 so as to rotate integrally with the rotor MG2R.

This reduction mechanism 4 reduces the driving power of at least one of the engine 1 and the second motor generator MG2 at a suitable reduction ratio. The reduced driving power is transmitted via the counter-drive gear 51, the counter-driven gear 52, the final ring gear 53, and the differential device 54 to the drive wheels 6.

Turbocharger

Figure 2:
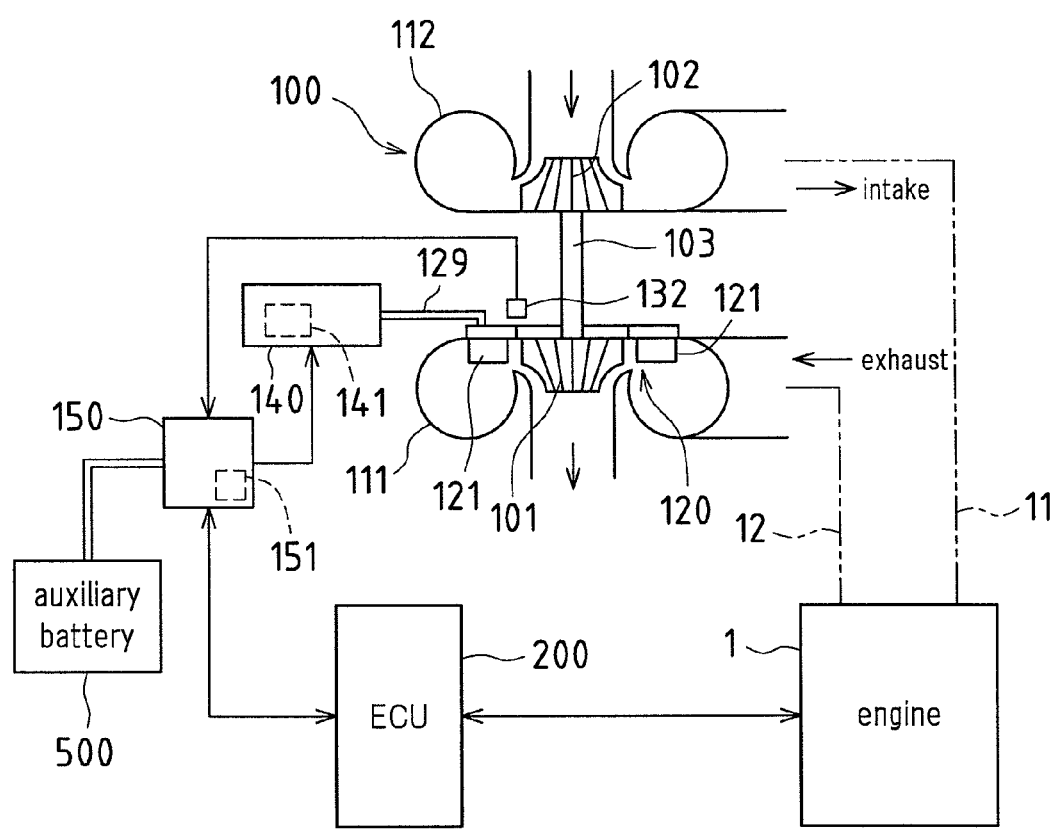
FIG. 2 is a schematic diagram illustrating an example of a turbocharger with which an engine is equipped.
Figure 3:
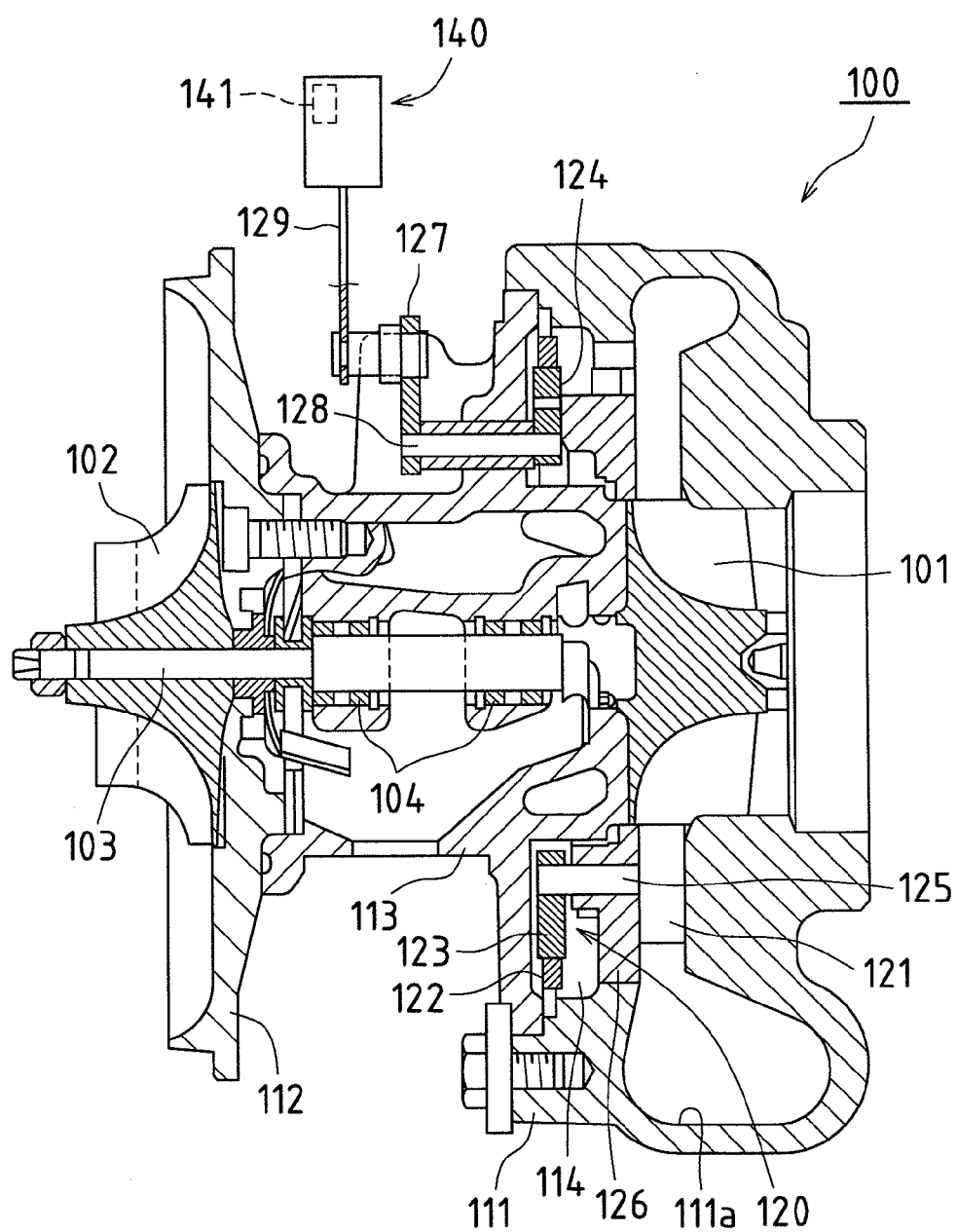
FIG. 3 is a longitudinal sectional view illustrating an example of the turbocharger with which the engine is equipped.

Referring to FIGS. 2 and 3, the following is an explanation of the turbocharger 100 with which the engine 1 is equipped.

The turbocharger 100 of this example includes a turbine wheel 101 arranged in an exhaust path 12, a compressor impeller 102 arranged in an intake path 11, and a coupling shaft 103 unitarily coupling the turbine wheel 101 and the compressor impeller 102 into one. The turbine wheel 101 arranged in the exhaust path 12 is rotated by the energy of the exhaust gas, and the compressor impeller 102 arranged in the intake path 11 follows this rotation. The intake air is thus supercharged by the rotation of the compressor impeller 102, and the supercharged air is forced into the combustion chamber of each of the cylinders of the engine 1.

It should be noted that the turbine wheel 101 is accommodated inside a turbine housing 111, and the compressor impeller 102 is accommodated inside a compressor housing 112. Moreover, floating bearings 104 supporting the coupling shaft 103 are accommodated inside a center housing 113, and the turbine housing 111 and the compressor housing 112 are attached to both sides of this center housing 113.

The turbocharger 100 of this example is a variable nozzle turbocharger (VNT), and is provided with a variable nozzle vane mechanism 120 on the side of the turbine wheel 101. By adjusting the opening degree of this variable nozzle vane mechanism 120 (VN opening degree), it is possible to adjust the supercharging pressure of the engine 1. The variable nozzle vane mechanism 120 is explained with reference to FIGS. 2 to 7.

The variable nozzle vane mechanism 120 is arranged in a link chamber 114 formed between the turbine housing 111 and the center housing 113 of the turbocharger 100.

The variable nozzle vane mechanism 120 includes an annular unison ring 122, a plurality of open/close arms 123 . . . 123 that are positioned on the inner side of the unison ring 122, a portion of the open/close arms 123 engaging the unison ring 122, a main arm 124 for driving the open/close arms 123, vane shafts 125 that are coupled to the individual open/close arms 123, for driving the nozzle vanes 121, and a nozzle plate 126 holding the vane shafts 125.

The variable nozzle vane mechanism 120 is a mechanism for adjusting the turning angle (turning attitude) of the plurality of (e.g. twelve) nozzle vanes 121 . . . 121, which are arranged at equal intervals. The plurality nozzle vanes 121 . . . 121 are arranged on the outer circumferential side of the turbine wheel 101. The nozzle vanes 121 are arranged on the nozzle plate 126, and can be turned by a predetermined angle around the vane shafts 125.

By turning the driving link 127, which is coupled to the main arm 124, by a predetermined angle, the variable nozzle vane mechanism 120 transmits this turning force via the main arm 124, the unison ring 122, and the open/close arms 123 to the nozzle vanes 121, thus turning the nozzle vanes 121. More specifically, the driving link 127 can be turned around a driving shaft 128. The driving shaft 128 is coupled to the driving link 127 and the main arm 124 such that they turn together. When the driving shaft 128 is turned by turning the driving link 127, then this turning force is transmitted to the main arm 124. The end on the inner circumferential side of the main arm 124 is fixed to the driving shaft 128. The end on the outer circumferential side of the main arm 124 engages the unison ring 122, and when the main arm 124 is turned around the driving shaft 128, then this turning force is transmitted to the unison ring 122.

The ends on the outer circumferential side of the open/close arms 123 are fitted to the inner circumferential surface of the unison ring 122, and when the unison ring 122 is turned, then this turning force is transmitted to the open/close arms 123. More specifically, the unison ring 122 is arranged to be slidable in circumferential direction with respect to the nozzle plate 126. The ends on the outer circumferential side of the main arm 124 and the open/close arms 123 are fitted to a plurality of recesses 122a that are arranged at the inner circumferential edge of the unison ring 122, and the rotation force of the unison ring 122 is transmitted to the open/close arms 123.

It should be noted that the nozzle plate 126 is fixed to the turbine housing 111. Pins 126a (see FIGS. 4 and 6) are inserted into the nozzle plate 126, and rollers 126b are fitted to the pins 126a. The rollers 126b guide the inner circumferential surface of the unison ring 122. Thus, the unison ring 122 is held by the rollers 126b and can be turned in a predetermined direction.

The open/close arms 123 can turn around the vane shafts 125. The vane shafts 125 are supported rotatably by the nozzle plate 126, and the open/close arms 123 and the nozzle vanes 121 are coupled by the vane shafts 125 such that they can turn together. Moreover, when the open/close arms 123 are turned together with the turning of the unison ring 122, then this turning movement is transmitted to the vane shafts 125. Thus, the nozzle vanes 121 turn together with the vane shafts 125 and the open/close arms 123.

The turbine housing 111 in which the turbine wheel 101 is accommodated is provided with a turbine housing vortex chamber 111a. The exhaust gas is supplied to this turbine housing vortex chamber 111a, and the turbine wheel 101 is rotated by the stream of the exhaust gas. In this situation, by adjusting the turning positions of the nozzle vanes 121 as described above and setting the turning angles of the nozzle vanes 121, it is possible to adjust the flow amount and the flow speed of the exhaust from the turbine housing vortex chamber 111a to the turbine wheel 101. Thus, it becomes possible to adjust the supercharging capability, and if the turning position (displacement) of the nozzle vanes 121 is adjusted in such a manner that the flow path area (throat area) between the nozzle vanes 121 is reduced during low rotation speeds of the engine 1, increasing the flow speed of the exhaust gas, it becomes possible to attain a high supercharging pressure from a low engine speed region.

The driving link 127 of the variable nozzle vane mechanism 120 is connected to a rod 129. This rod 129 is a rod-shaped member, which is coupled to a VN actuator 140. The VN actuator 140 includes an electric motor (DC motor) 141 and a conversion mechanism that converts a rotation of this electric motor 141 into a linear motion and transmits it to the rod 129 (for example, a gear mechanism having a worm gear and a worm wheel meshing with this worm gear; not shown in the drawings).

As shown in FIG. 2, the VN actuator 140 is drive-controlled by a VN controller 150. In response to a signal (for example a nozzle vane opening degree command value or the like) supplied from the ECU 200, the VN controller 150 controls the current flowing through the electric motor 141 of the VN actuator 140. An output signal of a nozzle position sensor 142 that detects the position (opening degree) of the nozzle vanes 121 is input into the VN controller 150. The VN controller 150 is further provided with a current detection sensor 151 that detects the current value of the electric motor 141. It should be noted that the power from an auxiliary battery 500 is supplied to the electric motor 141.

Moreover, in response to a signal (opening degree command value or the like) from the ECU 200, the VN controller 150 controls the current of (rotationally drives) the electric motor 141 of the VN actuator 140, the rotation force of the electric motor 141 is transmitted via the above-described rotation mechanism to the rod 129, and the driving link 127 turns in accordance with the movement (advancing/retreating movement) of the rod 129, so that the nozzle vane 121 is turned (displaced).

Figure 4:
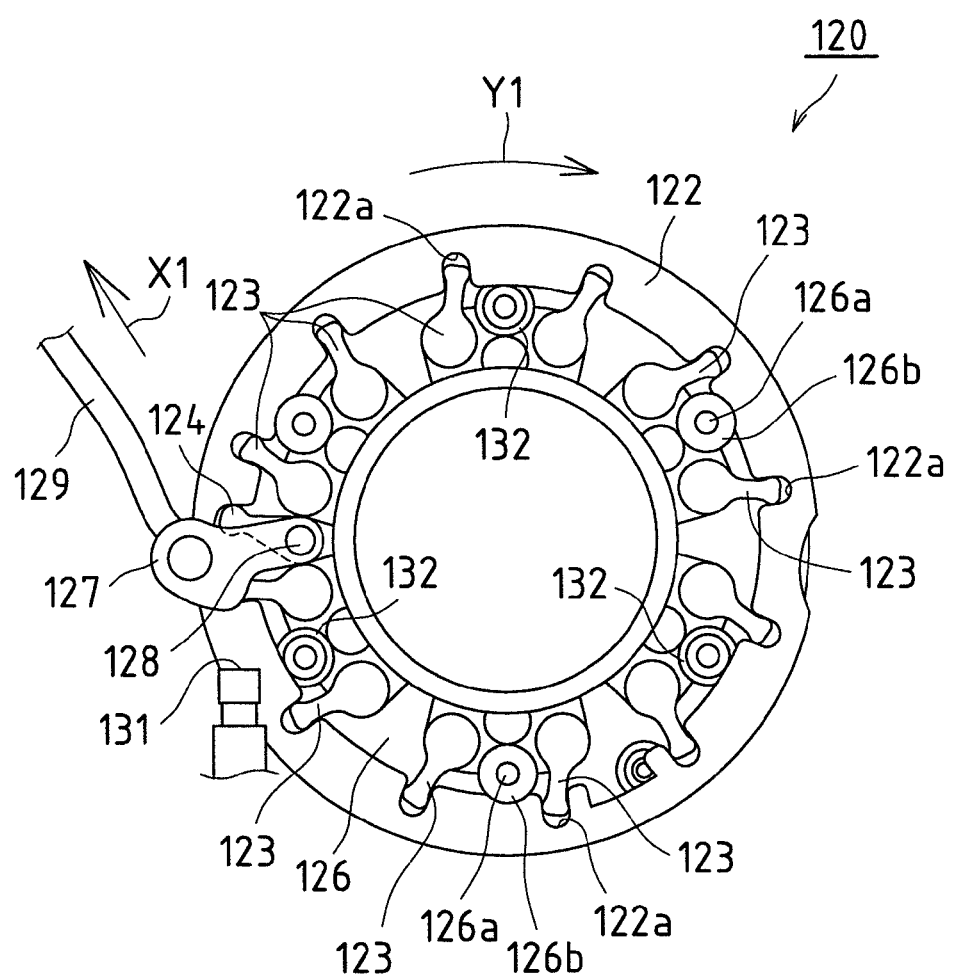
FIG. 4 is a diagram showing the variable nozzle vane mechanism from outside the turbocharger. Note that FIG. 4 shows a state in which the nozzle vanes are on the open side.
Figure 5:
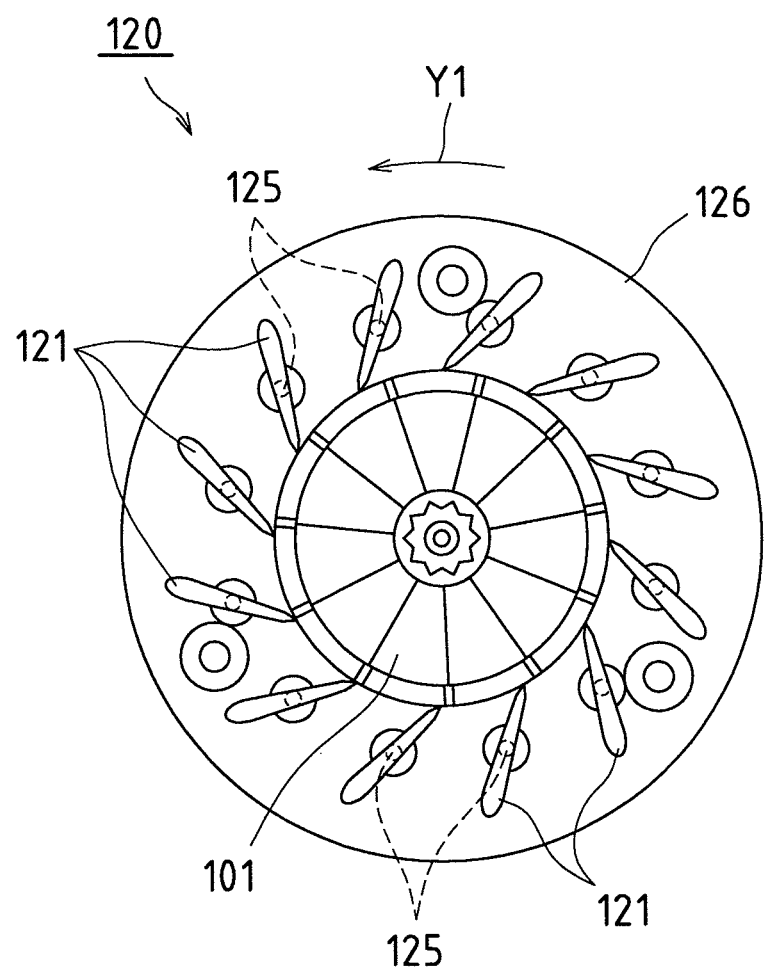
FIG. 5 is a diagram showing the variable nozzle vane mechanism from inside the turbocharger. Note that FIG. 5 shows a state in which the nozzle vanes are on the open side.

More specifically, as shown in FIG. 4, by pulling the rod 129 in the direction of the arrow X1 in FIG. 4 (retreating the rod 129), the unison ring 122 is turned in the direction of the arrow Y1 in FIG. 4, and as shown in FIG. 5, the nozzle vanes 121 are turned in counterclockwise direction (direction Y1) in FIG. 5 around the vane shafts 125, so that the nozzle vane opening degree (VN opening degree) is set to be larger.

Figure 6:
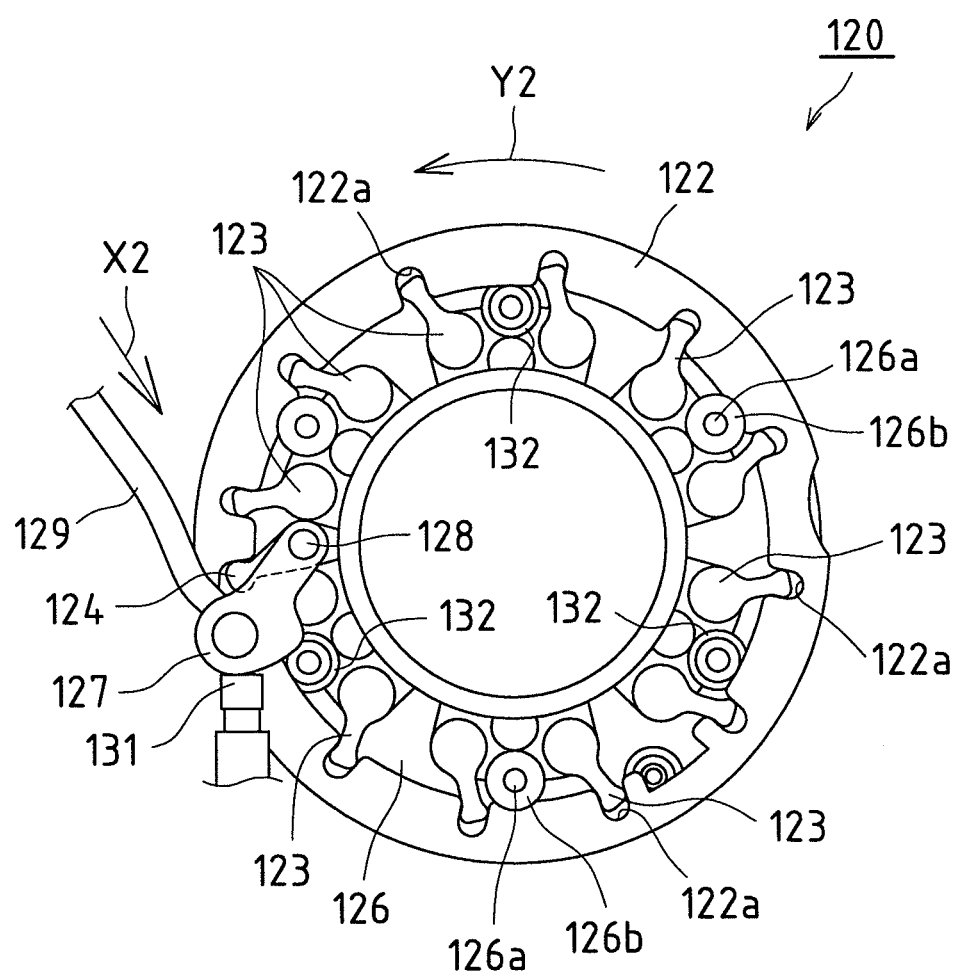
FIG. 6 is a diagram showing the variable nozzle vane mechanism from outside the turbocharger. Note that FIG. 6 shows a state in which the nozzle vanes are in the fully-closed position.
Figure 7:
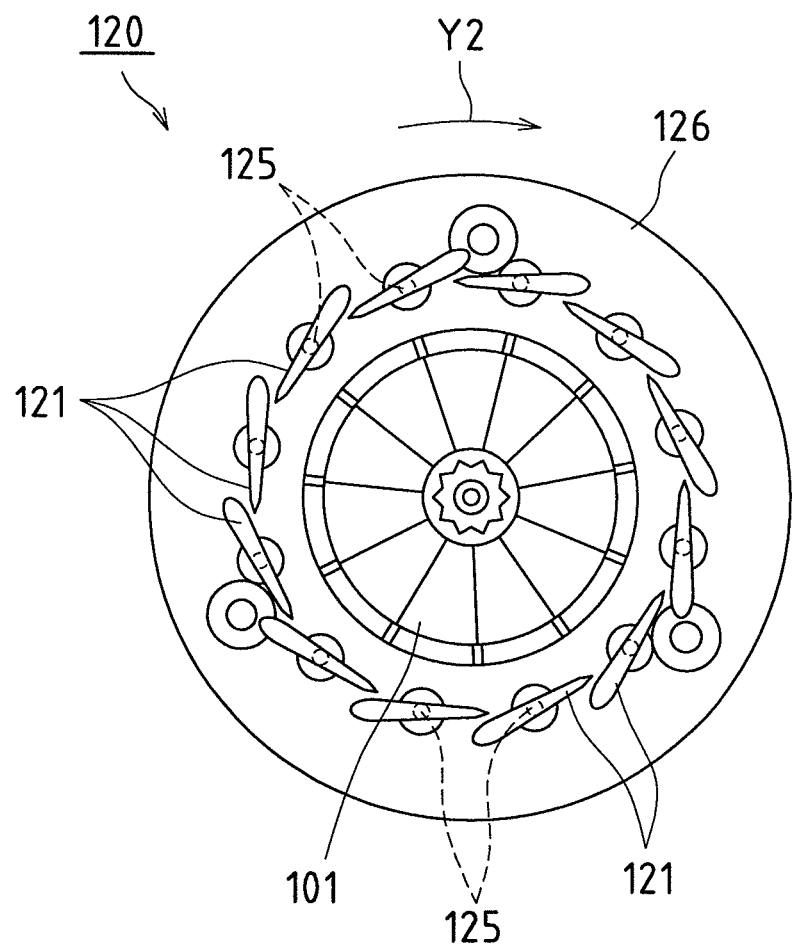
FIG. 7 is a diagram showing the variable nozzle vane mechanism from inside the turbocharger. Note that FIG. 7 shows a state in which the nozzle vanes are in the fully-closed position.

On the other hand, as shown in FIG. 6, by pushing the rod 129 in the direction of the arrow X2 in FIG. 6 (advancing the rod 129), the unison ring 122 is turned in the direction of the arrow Y2 in FIG. 6, and as shown in FIG. 7, the nozzle vanes 121 are turned in clockwise direction (direction Y2) in FIG. 7 around the vane shafts 125, so that the nozzle vane opening degree (VN opening degree) is set to be smaller.

In the variable nozzle vane mechanism 120 of this example, the range of the movement (open/closed range) of the nozzle vanes 121 is regulated by a fully-closed stopper 131 and fully-open stoppers 132.

As shown in FIGS. 4 and 6, the fully-closed stopper 131 is arranged at a position opposite to the driving link 127, and the position on the closed side of the nozzle vanes 121 (fully-closed position) is limited by letting the driving link 127 abut against the fully-closed stopper 131.

As shown in FIGS. 4 and 6, the fully-open stoppers 132 are provided at three (rotationally symmetric) locations of the circularly ring-shaped nozzle plate 126. The fully-open stoppers 132 are positioned between neighboring open/close arms 123. Moreover, the position on the open side (fully open position) of the nozzle vanes 121 is limited by letting these open/close arms 123 abut against the corresponding fully-open stoppers 132 when the nozzle vanes 121 are turned (displaced) maximally to the open side.

It should be noted that in vehicles equipped with the variable nozzle vane turbocharger 100, a control for learning the fully-closed position of the variable nozzle vane mechanism 120 can be carried out. More specifically, learning may be performed, in which, during an engine stop, the driving link 127 (nozzle vanes 121) is caused to abut against the fully-closed stopper 131, and the opening degree command value at this abutting position, that is, a reference position (mechanically fully closed position) is taken as the value that is further to the closed side (for example, opening degree command value=105%) than the opening degree command value (100%) for control to the fully-closed position. Then, in the opening degree control (VN control) of the nozzle vanes 121 during the regular engine operation, the VN opening degree is controlled by adjusting the opening degree command value in response to the engine operating state within a range of 0% ... 100% (where 100% corresponds to the control to the fully closed position).

ECU

The ECU 200 is an electronic control device that controls the engine 1 and the two motor generators MG1 and MG2 in coordination, and includes a CPU (central processing unit), a ROM (read-only memory), a RAM (random access memory) and a backup RAM, for example. The ROM stores various kinds of control programs as well as maps or the like that are looked up when executing these control programs. The CPU executes computation processing based on the control programs and the maps stored in the ROM. The RAM is a memory that temporarily stores computation results of the CPU as well as data or the like that it input from the sensors. The backup RAM is a non-volatile memory that stores data to be held, for example when the engine 1 is stopped.

As shown in FIG. 8, the ECU 200 is connected to an engine speed sensor 81 that detects the rotation speed (engine speed, rpm) of the crankshaft 10 serving as the output shaft of the engine 1, an accelerator opening degree sensor 82 that detects how much the accelerator pedal is pressed down (accelerator opening degree), a throttle opening degree sensor 83, an air flow meter 84 that detects the amount of air taken in (intake air amount), an intake temperature sensor 85 that detects the temperature of the intake air, a water temperature sensor 86 that detects the temperature of the cooling water of the engine 1 (cooling water temperature), and a vehicle speed sensor 87 that detects the speed of the vehicle. Signals from these sensors are input into the ECU 200. Moreover, the ECU 200 is connected to, for example, a throttle motor 14 that opens and closes the throttle valve 13 of the engine 1, a fuel injection device 15, and a VN controller 150 (VN actuator 140).

Based on the output signal of the above-noted sensors, the ECU 200 controls various aspects of the engine 1, such as the throttle opening degree (intake air amount) and the fuel injection amount of the engine 1. Furthermore, the ECU 200 carries out the "VN control" explained below.

Moreover, in order to manage the HV battery 400, the ECU 200 calculates the state of charge (SOC) of the HV battery 400, the input limit Win and the output limit Wout of the HV battery 400, based on the accumulated charge/discharge current detected by a current sensor (not shown) for the HV battery, the battery temperature detected by a battery temperature sensor, and the like.

The inverter 300 is connected to the ECU 200. The inverter 300 converts the DC current from the HV battery 400 for example in response to a command signal from the ECU 200 into a current for driving the motor generators MG1 and MG2, and on the other hand converts the AC current generated with the first motor generator MG1 from the motive power of the engine 1 as well as the AC current generated with the second motor generator MG2 by regenerative braking into a DC current for charging the HV battery 400. Moreover, depending on the running state, the inverter 300 supplies the AC current generated by the first motor generator MG1 as the driving power of the second motor generator MG2.

In the hybrid vehicle of this example, during engine running (this includes running that is assisted by the second motor generator MG2), and during motor running (running with the second motor generator MG2), an intermittent operation is carried out, in which the engine 1 automatically stops and starts when predetermined conditions are met.

More specifically, during engine running, if for example the cooling water temperature of the engine 1 is at least a predetermined temperature (for example 55° C. to 65° C.), the state of charge SOC of the HV battery 400 is within a predetermined control range, and the requested power (drive wheel output) corresponding to the amount by which the accelerator pedal is pressed down (accelerator opening degree) is not greater than a predetermined value (for example 2 kW to 10 kW), then the ECU 200 determines that the engine stop conditions are met (engine stop flag: ON). When the engine stop conditions are met, then a transition is made to motor running by stopping the fuel supply to the engine 1 (cutting the fuel) and thus stopping the engine 1. Note that in the hybrid vehicle of this example, the engine 1 can be completely stopped (engine speed=0) during motor running.

During motor running, if for example the requested power exceeds the nominal output of the second motor generator MG2 due to an increase in the amount by which the accelerator pedal is pressed down, or if the state of charge SOC of the HV battery 400 decreases and it becomes necessary to generate power with the first generator MG1, then the ECU 200 judges that the engine start conditions are met (engine start flag: ON). When the engine start conditions are met, fuel is no longer cut (fuel supply to the engine 1 is started), and the engine 1 is started by cranking it with the first motor generator MG1.

VN Control

The following is an explanation of the control of the variable nozzle vane mechanism 120 (VN control) during an engine stop while the vehicle is running.

First of all, in the conventional control, the VN opening degree during an engine stop is set by the control to the fully closed position (opening degree command value: 100%). Moreover, the driving link 127 (nozzle vanes 121) abuts against the fully-closed stopper 131 during the engine stop when carrying out the above-described fully-closed position learning, but in any case, the current flow through the electric motor 141 of the VN actuator 140 is stopped at the time when the processing stops, and after stopping the engine, no current flows through the electric motor 141 anymore.

Now, as noted above, in the hybrid vehicle, when the engine stop conditions are met during the engine running, the fuel is cut and the engine 1 is stopped, making a transition to motor running, but when running while the engine is stopped, for example the driving link 127 and the rod 129, which are structural members of the variable nozzle vane mechanism 120, may be subject to wear due to vibrations while the vehicle is running. That is to say, in the conventional control, as noted above, no current flows through the electric motor 141 after the engine has been stopped, so that a state is assumed in which no load acts on such members as the driving link 127 and the rod 129 (unconstrained state). Therefore, when vibrations (such as running vibrations) are applied from outside to the variable nozzle vane mechanism 120, then the driving link 127 and the rod 129 slide easily (their backlash portions slide) on the components fitted to them, so that wear may occur. When this wear advances, there is the risk that a malfunction occurs in the supercharging pressure control.

Note that also in the range of the movement of the nozzle vanes 121 (opening degree command value: 0% ... 100%), the structural members of the variable nozzle vane mechanism 120, such as the driving link 127 and the rod 129, are in a state in which they can slide, but during the engine operation, exhaust gas flows toward the nozzle vanes 121, and the driving link 127 and the rod 129 are constrained by the air pressure of this exhaust gas, that is, the load acting on the nozzle vanes 121, so that the problem of abrasive wear does not occur.

In this example, consideration is given to the above-described issues, and the technical feature is given that when the engine 1 is stopped while the vehicle is running, a control is continued by which a movable member of the variable nozzle vane mechanism 120 is mechanically abutted against a stopper, so that wear of the structural members of the nozzle vane mechanism 120, such as the driving link 127 and the rod 129, is suppressed.

Figure 9:
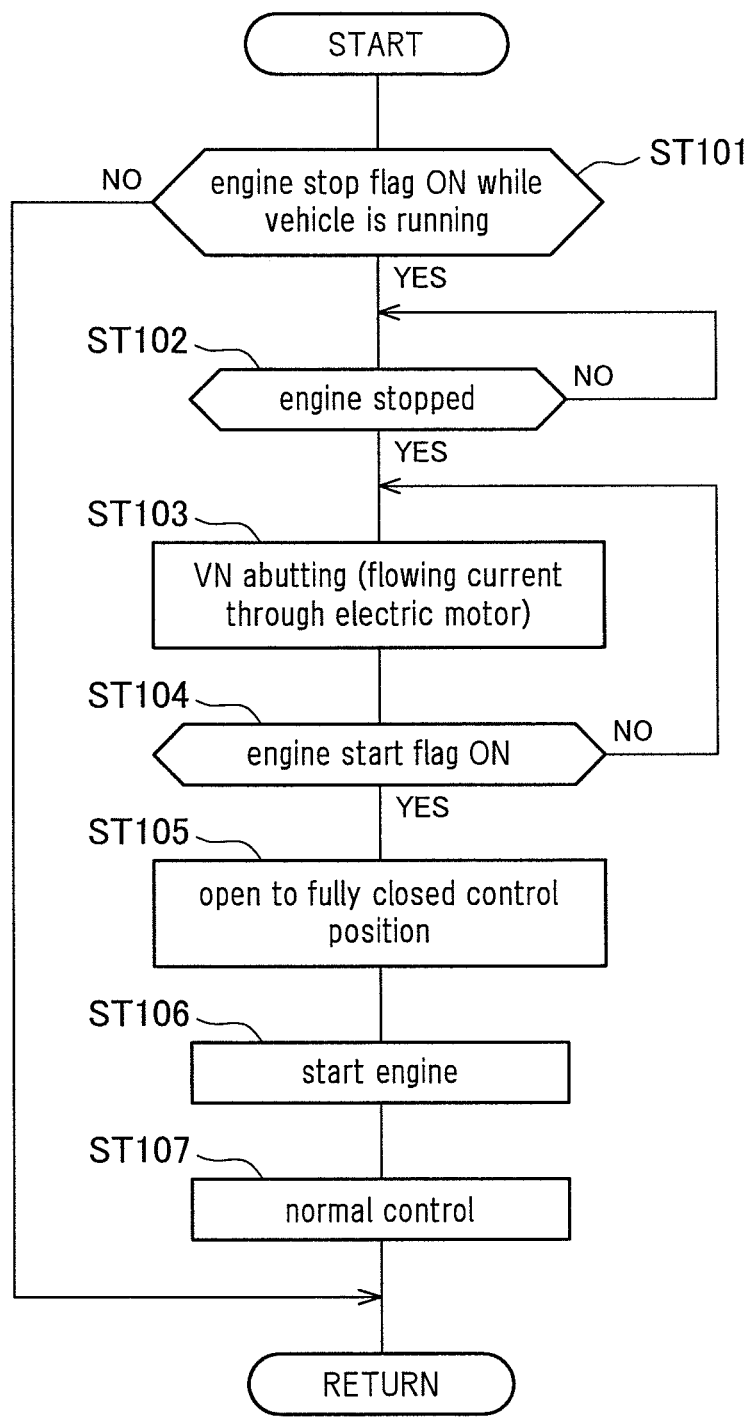
FIG. 9 is a flowchart showing an example of the control that is carried out when the engine is stopped during the running of the vehicle.

The specific control (VN control) for this is explained with reference to the flowchart in FIG. 9. The flowchart in FIG. 9 is executed by the ECU 200.

First of all, in Step ST101, it is judged whether "engine stop flag: ON" is given while the vehicle is running. If the result of this judgment is negative (NO), then the procedure returns. If the result of the judgment in Step ST101 is positive (YES) (that is, "engine stop flag: ON while the vehicle is running), then, the fuel is cut and the engine 1 is stopped, as described above. Note that the judgment whether the vehicle is running is performed based on the output signal of the vehicle speed sensor 87.

Next, it is judged in Step 102 whether the engine 1 is stopped or not. More specifically, at the time when the engine speed calculated from the output signal of the engine speed sensor 81 becomes "0", it is judged that the engine is stopped. It should be noted that the judgment whether the engine is stopped or not may also be performed, by judging in a state in which for example the engine speed is close to "0" that "the engine is stopped" when the engine speed (detection value) is smaller than a value (engine speed) at which no increase in the rotation speed of the turbocharger 100 occurs, even when the driving link 127 (nozzle vanes 121) abuts against the fully-closed stopper 131 (VN abutting).

When the judgment result in Step ST102 becomes positive (YES), current is caused to flow through the electric motor 141 of the VN controller 150 in Step ST103 (this current control is explained later), and the nozzle vanes 121 are displaced (turned) to the closed side, so that the driving link 127 (nozzle vanes 121) abuts against the fully-closed stopper 131 (VN abutting control). This VN abutting control in Step ST103 is carried out continuously until the engine start flag is turned ON, and at the time when "engine start flag: ON", that is, when the judgment result in Step ST104 becomes positive (YES), an opening-side current is caused to flow through the electric motor 141 (a current flowing in the opposite direction than in the VN abutting control), controlling the nozzle vanes 121 to be opened to the fully closed position (Step ST105).

After this, the fuel is no longer cut (the fuel supply to the engine 1 is started), and the engine 1 is started by cranking it with the first motor generator MG1 to perform normal control (Steps ST106 . . . ST107). More specifically, in accordance with the engine operation state, the VN opening degree is controlled by adjusting the opening degree command value within a range of 0% . . . 100% (where 100% corresponds to the control to the fully closed position).

As described above, with the VN control of this example, during an engine stop while the vehicle is running, the driving link 127 (nozzle vanes 121) abuts against the fully-closed stopper 131, so that the backlash (gap) of the sliding portions of the variable nozzle vane mechanism 120, such as the driving link 127 and the rod 129, is eliminated, and the driving link 127 and the rod 129 are constrained by the driving force of the electric motor 141. That is to say, by performing the abutting control of abutting against the stopper, it is possible to prevent the driving link 127 and the rod 129 from sliding on components fitted to them, even when vibrations during the running of the vehicle act on the variable nozzle vane mechanism 120. And by continuing this VN abutting control as long as the engine 1 is stopped while the vehicle is running, it is possible to prevent structural members of the variable nozzle vane mechanism 120, such as the driving link 127 and the rod 129, from suffering wear while the engine is stopped during the running of the vehicle.

During the above-described VN abutting control in Step ST103, the electric motor 141 does not need to be driven at full power. That is to say, a motor power is sufficient, with which it can be ensured that the structural members of the variable nozzle vane mechanism 120, such as the driving link 127 and the rod 129, are sufficiently constrained. The motor power during this VN abutting control is explained in the following.

Firstly, a lower limit of the motor load at which for example the driving link 127 and the rod 129 are constrained without sliding (sliding of the backlash portions), even when vibrations during the running of the vehicle act on the variable nozzle vane mechanism 120, is measured in advance by an experiment or a simulation or the like. Then, the value obtained by adding a predetermined margin to this thusly measured lower limit of the motor load is set as the motor target power (motor target power=lower limit of motor load+margin), and the current control of the electric motor 141 should be performed such that this motor target power is attained.

An example of the current control of the electric motor 141 is a method in which, based on the output signal of the current detection sensor 151 with which the VN controller 150 is provided, the current flowing through the electric motor 141 is limited such that a motor target power is attained that is smaller (for example about 50% of the full power) than the full power (the voltage of the power supplied from the auxiliary battery 500 to the electric motor 141 is substantially constant). Then, by controlling the motor power in this way, the power that is consumed while the VN abutting control continues can be reduced. Moreover, it can be avoided that the motor load becomes excessive, and also a reduction of the lifetime of the electric motor 141 can be suppressed.

Other Embodiments

In the above examples, during an engine stop while the vehicle is running, an abutting control (VN abutting control) is carried out that lets the driving link 127 (nozzle vanes 121) abut against the fully-closed stopper 131, but instead, it is also possible to constrain the structural members of the variable nozzle vane mechanism 120, such as the driving link 127 and the rod 129, with the motor load by continuing the control of letting the open/close arms 123 (nozzle vanes 121) abut against the fully-open stoppers 132 during an engine stop while the vehicle is running.

In the foregoing, an example was shown in which the present invention is applied to control (VN control) of a turbocharger in an FF (front engine, front-wheel drive) vehicle, but there is no limitation to this, and the present invention can also be applied to control (VN control) of a turbocharger in an FR (front engine, rear-wheel drive) vehicle or a four-wheel drive vehicle.

Moreover, also the transaxle of the hybrid vehicle is not limited to the embodiment shown in FIG. 1, and the present invention can also be applied to control (VN control) of a turbocharger in a hybrid vehicle equipped with a transaxle of another suitable embodiment, such as a transaxle provided with a gearing function, by which gearing is performed through engagement/disengagement of frictionally engaged elements.

In the foregoing, an example was explained in which the present invention is applied to the control of a hybrid vehicle equipped with two electric motors, namely a first motor generator and a second motor generator, but the present invention can also be applied to the control (VN control) of a turbocharger in a hybrid vehicle equipped with one electric motor or three or more electric motors.

In the foregoing, an example was explained in which the present invention is applied to control (VN control) of a turbocharger in a hybrid vehicle of a system in which the engine speed is made "0" by stopping the engine while the vehicle is running (the pistons are stopped), but there is no limitation to this, and but it is also possible to apply the present invention to control (VN control) of a turbocharger in a hybrid vehicle of a system in which the pistons move while engine driving is stopped during the running of the vehicle by closing the intake valve and the exhaust valve so that exhaust gas does not flow through the exhaust system (nozzle vanes). Moreover, also in a conventional vehicle, it is possible to apply the present invention to control (VN control) of a turbocharger in a vehicle in which the vehicle continues to run for a while after the engine is stopped.

Note that in the present invention, it is also possible to use a negative-pressure actuator or a hydraulic actuator as an actuator driving the variable nozzle vane mechanism, instead of the motor-type actuator using an electric motor as a driving source.

INDUSTRIAL APPLICABILITY

The present invention can be utilized in a control device of a turbocharger mounted to a hybrid vehicle or the like, and more specifically, can be utilized advantageously in a control device of a variable nozzle vane turbocharger.

REFERENCE SIGNS LIST 1 engine
12 exhaust path
81 engine speed sensor
87 vehicle speed sensor
100 turbocharger (variable nozzle vane turbocharger)
101 turbine wheel
102 compressor impeller
120 variable nozzle vane mechanism
121 nozzle vanes
127 driving link
128 driving shaft
129 rod
131 fully-closed stopper (mechanical stopper)
132 fully-open stopper (mechanical stopper)
140 VN actuator
141 electric motor
150 VN controller
151 current detection sensor
200 ECU
500 auxiliary battery

The invention claimed is:

1. A control device of a turbocharger comprising:
a turbine wheel provided in an exhaust path of an engine mounted to a vehicle;
a compressor impeller provided in an intake path of the engine;
a variable nozzle vane mechanism including a plurality of nozzle vanes provided on an outer circumferential side of the turbine wheel, the variable nozzle vane mechanism adjusting a flow of an exhaust gas with the plurality of nozzle vanes; and
an actuator driving the nozzle vane mechanism;
wherein the control device continues an abutting control that causes a movable member of the variable nozzle vane mechanism to abut against a mechanical stopper as long as the engine is stopped while the vehicle is running.

2. The control device of the turbocharger according to claim 1,
wherein the mechanical stopper is a stopper that limits a range of movement of the nozzle vanes.

3. The control device of the turbocharger according to claim 2,
wherein the actuator driving the variable nozzle vane mechanism is a motor-type actuator including an electric motor, which continuously performs said abutting control by continuously causing a current to flow through the electric motor as long as the engine is stopped while the vehicle is running.

4. The control device of the turbocharger according to claim 3,
wherein the current flowing through the electric motor is limited during said abutting control.

5. The control device of the turbocharger according to claim 4,
wherein said abutting control is continued from a stopping of the engine in accordance with an engine stop request until there is an engine start request.

6. The control device of the turbocharger according to claim 3,
wherein said abutting control is continued from a stopping of the engine in accordance with an engine stop request until there is an engine start request.

7. The control device of the turbocharger according to claim 2,
wherein said abutting control is continued from a stopping of the engine in accordance with an engine stop request until there is an engine start request.

8. The control device of the turbocharger according to claim 1,
wherein the actuator driving the variable nozzle vane mechanism is a motor-type actuator including an electric motor, which continuously performs said abutting control by continuously causing a current to flow through the electric motor as long as the engine is stopped while the vehicle is running.

9. The control device of the turbocharger according to claim 8,
wherein the current flowing through the electric motor is limited during said abutting control.

10. The control device of the turbocharger according to claim 9,
wherein said abutting control is continued from a stopping of the engine in accordance with an engine stop request until there is an engine start request.

11. The control device of the turbocharger according to claim 8,
wherein said abutting control is continued from a stopping of the engine in accordance with an engine stop request until there is an engine start request.

12. The control device of the turbocharger according to claim 1, wherein said abutting control is continued from a stopping of the engine in accordance with an engine stop request until there is an engine start request.

* * * * *